(No Model.)

F. TRIER.
LATHE FOR DRESSING STONE.

No. 283,685. Patented Aug. 21, 1883.

Witnesses:

Inventor:
Frank Trier (No Model.)          F. TRIER.          3 Sheets—Sheet 2.
LATHE FOR DRESSING STONE.
No. 283,685.          Patented Aug. 21, 1883.
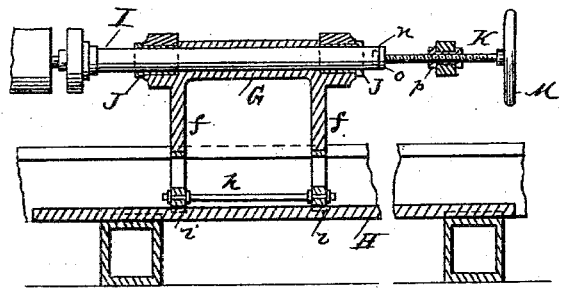
Fig. 3.
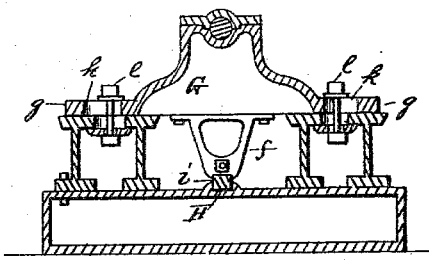
Fig. 4.
Fig. 5.
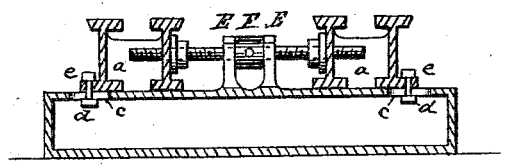
Fig. 6.
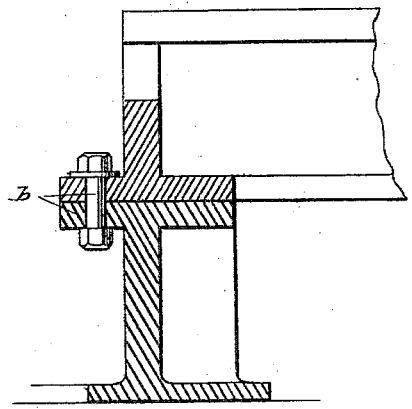
Witnesses.          Inventor.
Frank Trier (No Model.) F. TRIER. 3 Sheets—Sheet 3.
LATHE FOR DRESSING STONE.
No. 283,685. Patented Aug. 21, 1883.
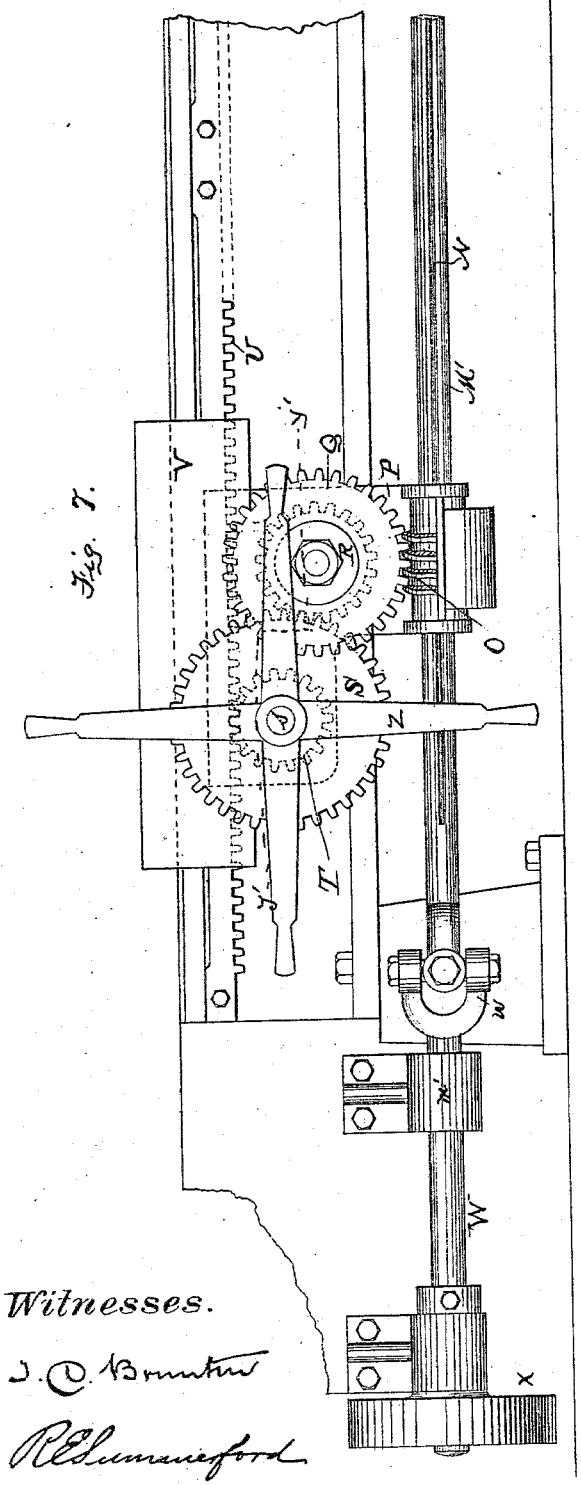
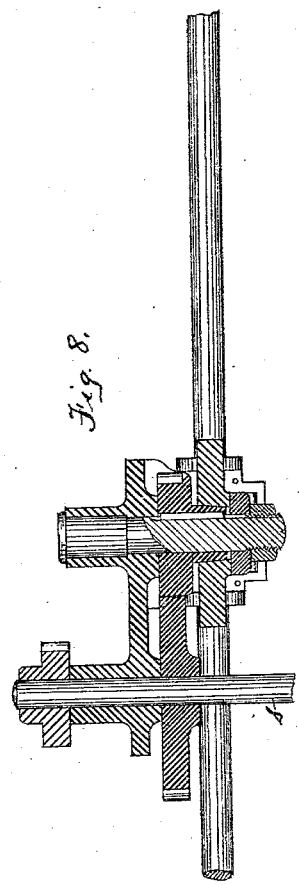
Witnesses.
Inventor.

UNITED STATES PATENT OFFICE.

FRANK TRIER, OF LONDON, COUNTY OF MIDDLESEX, ENGLAND, ASSIGNOR TO A. C. BALDWIN, OF BOSTON, MASSACHUSETTS.

LATHE FOR DRESSING STONE.

SPECIFICATION forming part of Letters Patent No. 283,685, dated August 21, 1883.

Application filed September 7, 1882. (No model.)

*To all whom it may concern:*

Be it known that I, FRANK TRIER, a subject of the Queen of Great Britain and Ireland, residing at London, in the county of Middlesex, England, have invented certain new and useful Improvements in Lathes for Dressing Stone; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to lathes and mechanism for dressing stone and other material; and it consists in certain novel details of construction, hereinafter more fully set forth, and pointed out in the claims.

Figure 1:
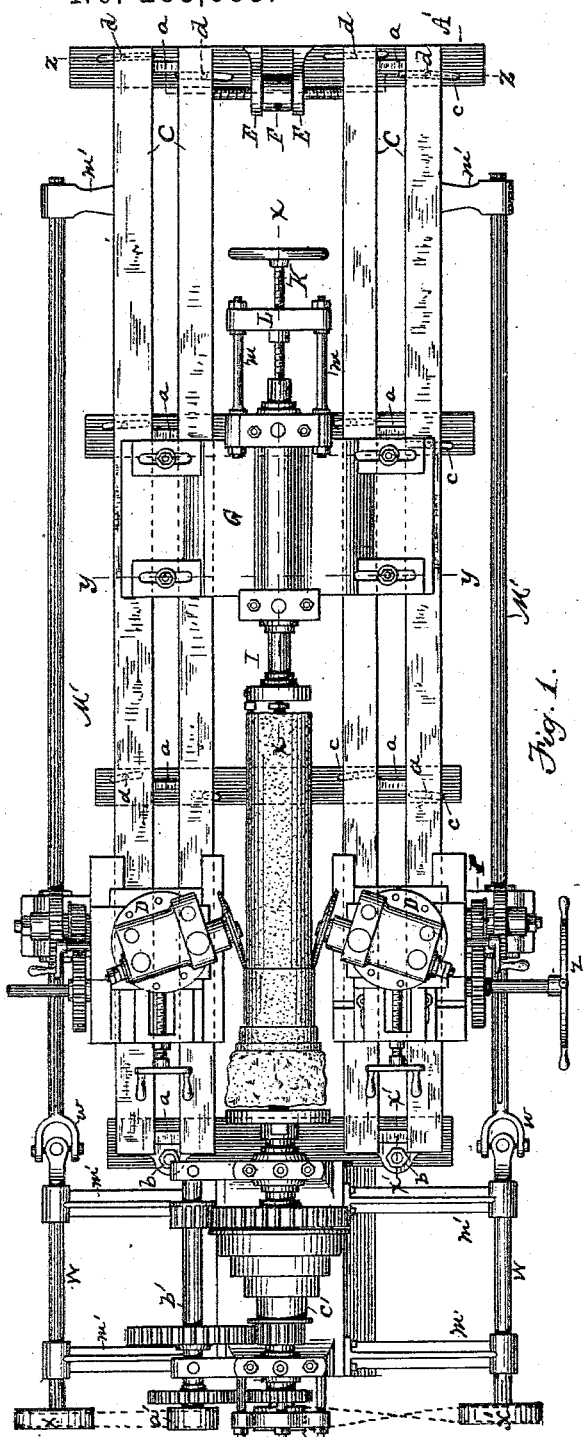
Figure 2:
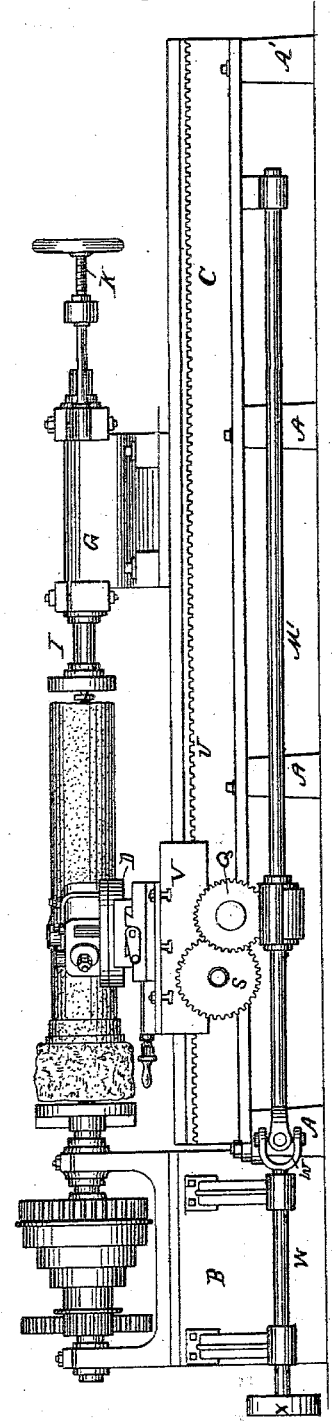

Figure 1 is a top view of my machine. Fig. 2 is a side elevation of the same. Fig. 3 is a sectional view on the line $x\ x$ of Fig. 1. Fig. 4 is a sectional view on the line $y\ y$ of Fig. 1. Fig. 5 is a similar view on the line $z\ z$ of Fig. 1. Fig. 6 is a detached sectional view on the line $x'\ x'$ of Fig. 1. Fig. 7 is a partial side view of worm-gearing for feeding or forcing the cutter-carrier and cutter to the work. Fig. 8 is a sectional view of the same on the line $y'$ $y'$ of Fig. 7.

In the drawings, A A designate the sills or cross-pieces on which the superstructure or operating parts of the machine are mounted.

B indicates the casting on which the driving mechanism and one of the chucks, or rather the head-stock for holding the material to be operated upon, are mounted.

C C are the ways or guides on which the cutters and cutter-carriers D D are mounted and adapted to be moved back and forth, and also to form supports for steadying the block or tail-stock in which the other chuck is mounted. The ways or guides C C are each composed of two plates or beams of metal or other suitable material, and are secured together by cross bars or pieces $a\ a$, or in any suitable manner, so that they will form a rigid girder or body to firmly support the cutters, and all possibility of their being displaced by the strain of the cutting action obviated. The ways or guides C C are pivoted at $b\ b$ to the casting B, and are free to work on said pivots, so that the other or outer ends of said ways or guides can be drawn toward each other, or placed farther apart, as circumstances may require, by means of devices which I will now describe.

E E are brackets secured to the outer sill, A', and in which is mounted a right and left hand screw, F, said screw being adapted to engage with right and left hand screw-threads in the inner bars of the ways C C, and by which means the ways are moved simultaneously and over identical distances to or from the stone to be dressed, so that a stone of any desired taper can be accurately cut.

It is obvious that by a proper manipulation of the ways or guides C C bands, capitals, ogee moldings, and many other ornamental devices can be formed on the column, as well as the formation of plain surfaces.

The sills A A, &c., are provided with slots $c\ c$, to receive screw-bolts $d\ d$, which pass through flanges in the bars of the ways or guides C C. The bolts $d\ d$ are provided with screw-nuts $e\ e$, which, when screwed down, serve to hold the ways C C firmly in any desired position parallel with the material to be operated upon, and at equal distances therefrom, and also equidistant from a line through the center of the head and tail stock.

G is the tail-stock, provided with downwardly-projecting arms $f\ f$ and side wings, $g\ g$. The arms or supports $f\ f$ are connected by means of a stay or brace rod, $h$, and are provided with notches or recesses in their lower ends, which fit over a central supporting-bar, H, secured to the sills A A, and by which means the tail-stock is kept in perfect alignment with the head-stock and adapted to be moved toward or from the head-stock to accommodate the machine for all sizes of work or to blocks of material of varying lengths. The side wings, $g\ g$, rest upon the ways or guides C C, and are provided with slots $k\ k$, through which the bolts $l\ l$ pass, and by which means the tail-stock is secured to the guides or ways C C and steadied thereby.

I is the mandrel of the tail-stock, and is provided with phosphor-bronze boxes J J, as shown in Fig. 3. The mandrel is free to revolve in the tail-stock, and is adjusted to the work and backward motion prevented by means of the screw K, mounted in the cross-bar L, which is supported by the rods m m, secured to the tail-stock. The inner end of the screw K is provided with a head, n, which fits into a cavity in the end of the mandrel, and is covered by a cap, o. The outer end of the screw K is provided with a hand-wheel, M, by which the screw is operated to tighten the mandrel against the material to be operated upon. The screw K is also provided with jam-nuts p p, on each side of the bar L, and by which the screw is held in position.

I will now proceed to describe the mechanism by which the cutters are fed to their work.

M′ M′ are two rods or bars secured to the sides of the guides or ways C C by means of the brackets m′ m′. The rods or bars M′ M′ are provided with a groove or spline, N, (see Fig. 7,) in which a feather or key on the worm-gear O fits, and by which means the worm-gear is rotated.

The cutter-carrying frame or bed V is provided with an apron or extension, P, the lower end of which surrounds the bar M′ at each end of the worm-gear O, so that the worm is carried along with the cutter-carrying bed or frame by the devices which I will now proceed to describe.

Q is a pinion-wheel, mounted on a suitable shaft secured in the cutter-carrying frame. This pinion-wheel meshes with and is driven by the worm-gear O. A smaller pinion-wheel, R, is mounted on the same shaft with the pinion Q, and meshes with a pinion, S, on the shaft or spindle s, which is also secured in the cutter-carrying bed or frame. On the shaft or spindle s is secured a second pinion-wheel, T, which meshes with the pinion-rack U on the guides or ways C C, and thus causes the cutter-carrying bed or frame V to be moved along the guides and the cutters fed up to the work.

The rods or bars M′ are connected at their front ends to the shafts W by means of universal joints w, so that the expansion or contraction of the guides or ways to or from the work will not interfere with the operation of the rods M′ and W. The shafts W are provided with pulley-wheels x x′, through which power is applied to them, one being driven by a belt leading to a pulley, a′, on the main driving-shaft b′, while the other shaft is driven by a belt passing from its driving-pulley x′ to a pulley, a″, on the shaft c′ of the head-stock or chuck.

Z is a hand-wheel secured to the shaft s, by which the cutter-carriage can be moved back and forth on the rod M′ by hand when desired. The worms O on the shafts M′ have feathers sliding in the longitudinal grooves N, formed in the shafts M′, so that the revolutions of the latter cause the worms to revolve with them, but leave worms O free to receive longitudinal motion.

The operation of my machine is as follows: The stone to be dressed having been properly mounted between the head and tail stocks, the guides or ways are set at the proper distance from the stone, so as to admit of the cutters operating on the stone at the proper angle to form the proper configuration on the stone, in which position they are secured by the tightening up of the bolts which hold them to the sills. The bolts l, which hold the tail-stock to the guides or ways, are next tightened, so that all the parts are rigidly bound together. Power is now applied from any convenient source and by any suitable means to rotate the stone or other article to be dressed, while the cutters which are in contact with the stone are rotated by such frictional contact and cut or trim the stone to any depth desired, which is determined by the distance the guides are set from the stone. Motion is also imparted to the shafts W and M′ by the devices heretofore described, and by which means the cutters, together with the cutter-carrying frame or bed, are caused to travel back and forth on the rods or shafts M′, and advance the cutters to the work or remove them therefrom, as it is obvious that by turning the rods M′ in one direction the cutters will be fed forward, and by reversing the direction the cutters will be carried in a reverse direction.

It is obvious that one cutter mounted on a movable guide or way might be used in certain kinds or classes of work, and such construction I consider within the spirit of my invention; but by preference I use two cutters, one on each side of the stone. They may be directly opposite each other—that is, they may impinge on the stone in the same axial line, or one may be placed a little above and the other a little below a central longitudinal or axial line of the stone to be dressed—by which means the stone is braced on both sides and the strain on the chucks or head and tail stocks greatly diminished. The cutters are securely mounted on the bed V and made adjustable, so that they can be brought to bear on the surface of the stone to be dressed at any desired angle, and also adjusted to work of varying sizes.

Having thus described my invention, what I claim, and desire to secure by Letters Patent, is—

1. The shafts W W, secured to the bed-frame B, in combination with the universal joints w w and shafts M′ M′, secured to the pivoted guides C C, whereby the cutters can be operated at any desired angle with relation to the face of the stone, as set forth.

2. In a lathe for dressing stone, the tail-stock G, adjustable to suit the different angles of the ways C, and provided with the arms or supports f f and side wings or extensions, g g, in combination with the central guides or ways, substantially as shown and described, and for the purpose set forth.

3. In a lathe for dressing stone, the tail-stock G, provided with central arms, f f, the central supporting-guide, H, the wings g on the tail-stock, having slots $k\ k$, and bolts $l\ l$, for adjusting the tail-stock G, in combination with the pivoted guides or ways C C, all substantially as and for the purpose specified.

4. In a machine for dressing stone, the pivoted guides or ways C C, adapted to be moved to and from the stone to be dressed, with the brackets E E, right and left hand screw F, in combination with the curved slots $c\ c$ in the sills A A′, and bolts $d\ d$, whereby said guides are moved simultaneously and uniformly toward or from the stone, and secured, in the manner shown, and for the purpose specified.

In testimony whereof I affix my signature in presence of two witnesses.

FRANK TRIER.

Witnesses:
J. S. EDW. BEESLEY,
S. S. PURRY,
*Both of 2 Pope's Head Alley, Cornhill, London, Gents.*